(12) United States Patent
Saleh

(10) Patent No.: US 9,687,813 B2
(45) Date of Patent: Jun. 27, 2017

(54) ACTIVATED CARBON/ALUMINUM OXIDE/POLYETHYLENIMINE COMPOSITES AND METHODS THEREOF

(71) Applicant: King Fahd University of Petroleum and Minerals, Dhahran (SA)

(72) Inventor: Tawfik A. Saleh, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 232 days.

(21) Appl. No.: 14/580,311

(22) Filed: Dec. 23, 2014

(65) Prior Publication Data

US 2016/0175814 A1 Jun. 23, 2016

(51) Int. Cl.

| | |
|---|---|
| *B01J 20/08* | (2006.01) |
| *B01J 20/28* | (2006.01) |
| *B01J 20/20* | (2006.01) |
| *B01J 20/26* | (2006.01) |
| *B01J 20/30* | (2006.01) |
| *B01J 20/32* | (2006.01) |
| *C02F 1/28* | (2006.01) |
| *C02F 101/20* | (2006.01) |

(52) U.S. Cl.
CPC ......... *B01J 20/28016* (2013.01); *B01J 20/20* (2013.01); *B01J 20/265* (2013.01); *B01J 20/3085* (2013.01); *B01J 20/3293* (2013.01); *C02F 1/288* (2013.01); *C02F 1/283* (2013.01); *C02F 2101/20* (2013.01)

(58) Field of Classification Search
CPC .............................. B01J 20/20; B01J 20/3085
See application file for complete search history.

(56) References Cited

U.S. PATENT DOCUMENTS

| | | | |
|---|---|---|---|
| 5,620,940 A | 4/1997 | Birbara et al. | |
| 6,852,903 B1 * | 2/2005 | Brown ..................... | A62D 3/36 502/417 |
| 2005/0167358 A1 | 8/2005 | Taylor et al. | |

* cited by examiner

*Primary Examiner* — Stuart Hendrickson
(74) *Attorney, Agent, or Firm* — Oblon, McClelland, Maier & Neustadt, L.L.P.

(57) ABSTRACT

Activated carbon (AC) composites as adsorbents for mercury removal in water treatment. The AC composites comprise an AC as the core particle, with aluminum oxide ($Al_2O_3$) and polyethylenimine (PEI) grafted on the surface of the AC core particle to increase the surface area, number of active sites and adsorption capacity. Methods of preparing and characterizing the AC composites by scanning electron microscope (SEM), energy dispersive X-ray (EDX) and Fourier transform infrared absorption spectroscopy (FTIR) are also provided.

17 Claims, 11 Drawing Sheets

ACTIVATED CARBON/ALUMINUM OXIDE/POLYETHYLENIMINE COMPOSITES AND METHODS THEREOF

BACKGROUND OF THE INVENTION

Technical Field

The present invention relates to adsorbents for wastewater treatment. More specifically, the present invention relates to activated carbon composites as high-capacity adsorbents for removal of mercury and other toxic metals from wastewater and any aqueous media.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The development of industry has led to severe problems of water pollution which is considered a problem due to its increasing toxic threat to humans and the environment. It is imperative for wastewater treatment for the removal of pollutants to provide good quality water. Organic and inorganic pollutants have been reported to thrive in such waste waters. Among these, metal pollutants are not biodegradable, and persist in the environment for a long time. Such pollutants are toxic, pose a serious threat to the environment. Among toxic inorganic or metal ions include arsenic, cadmium, selenium, antimony, lead, chromium and mercury.

Different techniques for wastewater treatment are available, including reverse osmosis, ion exchange, electrodialysis, and electrolysis. However, such methods have their own limitations such as low efficiency, sensitive operating conditions and further the disposal is a costly affair. Continuous increase in the variety, amount and complexity of the toxic pollutants has made the conventional wastewater treatment methods ineffective. Alternative technology is adsorption where adsorbents are used to remove the pollutants. Thus, it is required to have low cost and efficient adsorbents for large-scale use in water treatment with regenerability.

Carbon materials like activated carbon, carbon nanotubes and graphene can be used as adsorbents for the advanced treatment of wastewater. These carbon materials can be used for the removal of organic and inorganic pollutants from aqueous media. Other materials that can also be used as adsorbents include iron oxide, manganese oxide (birnessite), zeolites, titania, clay. Among these different types of adsorbents, activated carbon is of a considerably lower cost.

However, activated carbon can suffer from either low adsorption efficiency or pollutants easily leaching away from the surface after adsorption. Several methods have been reported to enhance its activity. For example, activated carbon was loaded with some metal oxides and nanoparticles. The presence of functional groups on the adsorbent surface reduces the binding energy, while increasing the uptake kinetics at low coverage, thus enhance the efficiency of the adsorbent.

Accordingly, there remains a need for novel adsorbent materials for wastewater treatment that can advantageously combine properties such as high surface area, high adsorption capacity and regenerability.

BRIEF SUMMARY OF THE INVENTION

According to a first aspect, the present invention provides an activated carbon/aluminum oxide/polyethylenimine composite. The composite comprises an activated carbon particle core, an aluminum oxide coating on the surface of the activated carbon particle core and a polyethylenimine polymer covalently or ionically bonded to the aluminum oxide coating.

In one or more embodiments, the aluminum oxide coating comprises aluminum oxide nanoparticles attached to the surface of the activated carbon particle core.

In one or more embodiments, the polyethylenimine polymer in the composite is covalently bonded to the aluminum oxide coating through an amide linkage.

In one or more embodiments, the polyethylenimine polymer is ionically bonded to the aluminum oxide coating through an Al—N linkage.

In one or more embodiments, the composite has an aluminum content of 1-2 wt. % based upon the total weight of the composite.

In one or more embodiments, the composite has a nitrogen content of 1-2 wt. % based upon the total weight of the composite.

In one or more embodiments, the activated carbon in the composite is in powder form.

In an alternative embodiment, the activated carbon in the composite is in granular form.

According to a second aspect, the present invention provides a method of removing mercury from an aqueous medium. The method comprises contacting the aqueous medium with the activated carbon/aluminum oxide/polyethylenimine composite according to the first aspect of the invention to adsorb mercury from the aqueous medium.

In one or more embodiments, the contacting is carried out in a batch mode.

In one or more embodiments, the contacting is carried out in a fixed-bed mode.

In one or more embodiments, the contacting is carried out for 2-30 min.

In one or more embodiments, the contacting is carried out at pH 4-9.

In one or more embodiments, the composite is effective in a dosage of 0.2-2.0 g/L in a batch mode.

In one or more embodiments, the composite is effective in a dosage of 0.3-1 g/mL based upon the fixed-bed volume.

In one or more embodiments, the method further comprises desorbing the mercury from the activated carbon/aluminum oxide/polyethylenimine composite to regenerate the composite for mercury removal.

According to a third aspect, the present invention provides a method of preparing the activated carbon/aluminum oxide/polyethylenimine composite according to the first aspect of the invention. The method comprises oxidizing the activated carbon to form an oxidized activated carbon, co-precipitating the oxidized activated carbon with an aluminum salt to form an activated carbon/aluminum oxide intermediate and impregnating the activated carbon/aluminum oxide intermediate with polyethylenimine to produce the activated carbon/aluminum oxide/polyethylenimine composite.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
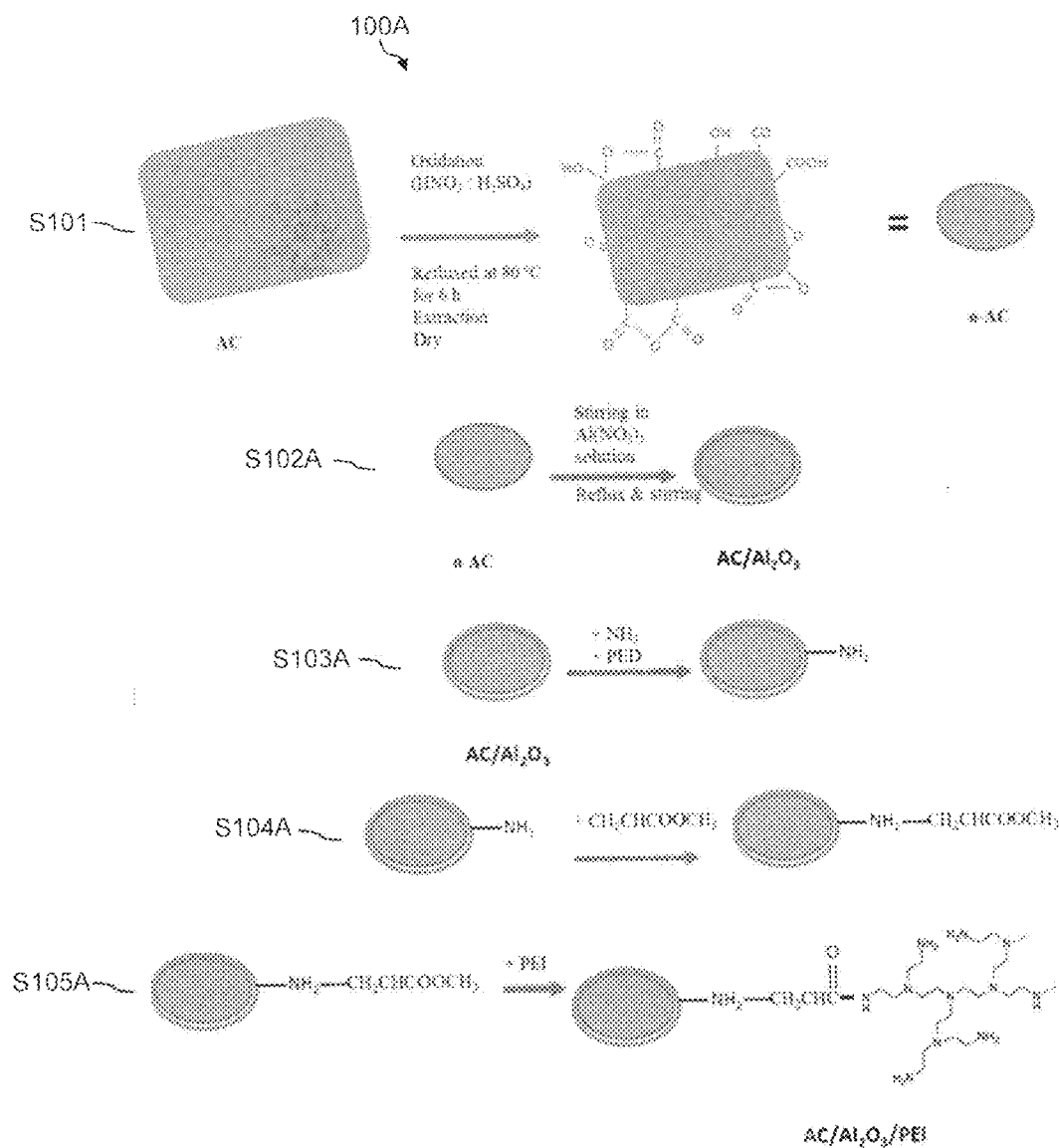
FIG. 1A is a schematic illustration of the preparation of activated carbon/alumina/polyethylenimine ($AC/Al_2O_3/PEI$) composite according to one embodiment.

Referring now to the drawings, wherein like reference numerals designate identical or corresponding parts throughout the several views.

The present invention provides novel activated carbon (AC) composites that can effectively adsorb and remove 100% of the mercury ions that are present in an aqueous media, such as wastewater.

For purposes of the present invention, "activated carbon" or "AC", which is also sometimes called activated charcoal and activated coal, is a non-graphite form of carbon converted and processed from any organic carbonaceous material (coal, biochar, lignite, wood, peat, paddy husk, coir pith, coconut shell, etc.) to have small, low-volume pores that increase the surface area available for adsorption and/or chemical reactions. The pores on AC can be nanopores, such as, as set out by IUPAC: macropores (pore diameter 50-1000 nm), mesopores (pore diameter 2-50 nm) and micropores (diameter 0.2-2 nm). The raw materials are typically heated in at least two stages to form AC.

As used herein, AC can be in crushed or ground particulate form as powders (powdered AC or PAC) and fine granules (granular AC or GAC). PAC has an average particle size of less than 200 mesh or 74 μM, for example 10-50 μm with a bulk dry or apparent density of 0.34-0.74 kg/L. PAC is more commonly used as a direct additive to a solution of media. GAC, on the other hand, has a larger particle size, i.e. average particle size of larger than 0.1 mm, for example 0.4-2.5 mm with a bulk dry density of 0.22-0.5 kg/L. GAC is more commonly used in a fixed manner, such as in adsorption columns and filters.

For purposes of the present invention, "composite materials", "composition materials", "composites" or "compositions" refer to materials made with AC as a primary constituent material (and are therefore porous) and at least one other constituent material with significantly different physical or chemical properties, that when combined, produce an AC composite with characteristics different from or are synergistic of the individual properties, such as increased surface area, increased number of active sites, enhanced adsorption capacity and regenerability.

In a preferred embodiment, materials that can be combined with AC to produce an AC composite include an aluminum compound and a hydrophilic or water soluble polymer or co-polymer. Both the aluminum compound and the hydrophilic polymer preferably have adsorbent capacities, and/or other properties such as coagulant, flocculant and agglomerant properties.

Examples of the aluminum compound include aluminum oxide or alumina ($Al_2O_3$), aluminum salts such as aluminum phosphate, aluminum sulfate, aluminum hydroxide and aluminum nitrate. In one embodiment, the aluminum compound is aluminum oxide.

The hydrophilic polymer can be a amine-functional polymer, such as polyallylamine, polyethylenimine or polyaziridine, poly(2-oxazoline). The hydrophilic, amine-functional polymer can be linear, branched or dendrimeric, with the multiple groups found on their main- or side-chains. Branched and dendrimeric hydrophilic, amine-functional polymers are preferred over the linear ones as they provide more active sites for adsorption. In one embodiment, the hydrophilic polymer is polyethylenimine (PEI).

In one embodiment, the AC composite is $AC/Al_2O_3/PEI$. $Al_2O_3$ can be combined with AC such that AC is the particle core or support and aluminum atoms are bonded to the AC particle core by a C—O—Al linkage. The $Al_2O_3$ molecules, preferably $Al_2O_3$ nanoparticles with an average particle size of 10-100 nm, preferably 30-80 nm, more preferably 40-60 nm, form a coating on surface of the AC core particle. The coating may be continuous or discontinuous. In one embodiment, the AC core is completely covered with an $Al_2O_3$ layer made of one or more of $Al_2O_3$ particles or a layer of $Al_2O_3$.

In one embodiment, the PEI polymer is then covalently bonded to the aluminum oxide coating through an amide linkage. For example, $Al_2O_3$ can be further mixed with ammonia then dimethylformamide and methylacrylate/methyl methacrylate to form $AC/Al_2O_3$—$NH_2$—$COOCH_3$. The leaving group —$OCH_3$ in the intermediate $AC/Al_2O_3$—$NH_2$—$COOCH_3$ is replaced by attaching N from PEI. Therefore, —$OCH_3$ from $AC/Al_2O_3$—$NH_2$—$COOCH_3$ and a hydrogen atom from PEI are released as $HOCH_3$.

In an alternative embodiment, PEI is covalently bonded to an amide unity that is datively bonded to $Al_2O_3$ through a nitrogen atom.

In another alternative embodiment, the PEI polymer forms an Al—N ionic bond with the aluminum in $Al_2O_3$. For example, when $AC/Al_2O_3$ is treated immediately with PEI.

The OH group from AC/Al$_2$O$_3$ and a hydrogen atom from PEI will produce H$_2$O and an ionic Al—N bond is formed between PEI and AC/Al$_2$O$_3$.

In yet another alternative embodiment, the AC core particle is covered with an Al$_2$O$_3$ phase that can be produced with a similar method to Al$_2$O$_3$ particle without calcination.

In another embodiment, the AC composite is AC/Al$_2$O$_3$.

In yet another embodiment, the AC composite is AC/PEI.

To prepare the AC/Al$_2$O$_3$ or the AC/Al$_2$O$_3$/PEI composite, AC can be first oxidized by an agent such as a strong acid (HCl, H$_2$SO$_4$, HNO$_3$ or mixtures thereof) to prepare oxidized AC as a support for preparing the composites. To prepare AC/Al$_2$O$_3$ which can be an intermediate or a final product itself, the oxidized AC is optionally co-precipitated by drop-wise titration with an aluminum salt such as aluminum nitrate and aluminum sulfate. Al$_2$O$_3$ nanoparticles can be prepared in situ to coat the surface of AC.

The AC/Al$_2$O$_3$ can be further treated with a PEI aqueous solution to impregnate the surface of AC/Al$_2$O$_3$ with PEI to form the AC/Al$_2$O$_3$/PEI composite.

The primary elements present in AC/Al$_2$O$_3$/PEI include carbon (70-80 wt. %), oxygen (15-25 wt. %), nitrogen (1-2 wt. %) and aluminum (1-2 wt. %). Compared to AC/Al$_2$O$_3$/ PEI, AC/Al$_2$O$_3$ is substantially free of nitrogen (due to absence of PEI) which can be compensated by a higher aluminum content (up to 6 wt. %). All weight percentage values are based upon the total weight of a respective AC composite.

The AC composites disclosed herein are effective in adsorbing mercury in both batch and fixed-bed modes. In the batch mode, such as in an aqueous media where mercury ions are present at concentrations of up to 100 ppm, the AC composite can be added to the media at a final concentration range of 0.2-2.0 g/L, preferably 0.5-1.5 g/L, more preferably 0.7-1.0 g/L. In the fixed-bed mode, such as an in adsorption column, the amount of the AC composite in the column can be in the range of 0.05-2.0 g, preferably 0.1-1.0 g, more preferably 0.2-0.5 g.

In the batch mode, the contact time for mercury adsorption is up to 30 min, preferably 2-30 min, more preferably 5-30 min. Preferably, at least 45% of the mercury ions presented in a treated aqueous media can be successfully removed in the first 5 min of the contact time, preferably more than 70%, more preferably more than 90%. At the end of the contact time, more than 60% of the mercury ions are removed, preferably more than 95%, more preferably more than 99%. The equilibrium time for a batch mode adsorption by an AC composite is 10-20 min.

The AC composites provided in the present invention are effective in adsorbing mercury over a pH range of 4-9, preferably at an acidic pH range of 5-6.

The AC composites described herein can be regenerated and reused as a mercury adsorbent for at least 5 cycles with minimal decrease in adsorption efficiency (no more than a 2% decrease in mercury removal with each regeneration cycle). To regenerate the adsorbent, mercury is desorbed from an AC composite and this can be achieved by treating a spent AC composite, i.e. a mercury-loaded AC composite in a strong basic solution, such as NaOH or KOH of at least 0.5 M in concentration.

In certain embodiments, the AC composites of the present invention are effective in adsorbing other toxic heavy metals and semi-metals from aqueous media, such as but are not limited to lead, zinc, chromium, copper, nickel, silver, cadmium, iron, tin, manganese, arsenic, beryllium and selenium.

The present invention relates to methods of treating water or any aqueous media and methods of removing mercury from water or any aqueous by contacting the water or the aqueous media with an AC composite provided herein.

The following examples are intended to further illustrate exemplary protocols for preparing and characterizing the AC/Al$_2$O$_3$/PEI composites, and are not intended to limit the scope of the claims.

EXAMPLE 1

Materials

Chemicals such as nitric acid, sulfuric acid, ethanol, aluminum nitrate, ammonia, dimethylformamide and methylacrylate, methyl methacrylate, ethylenediamine (PED), polyethylenimine (PEI), dimethylformamide (DMF) and mercury (II) stock solution, were commercially purchased. Mercury solutions of different initial concentrations were prepared by diluting the stock solution in appropriate proportions. All chemicals were of analytical grade and used without further purification. All glassware were cleaned by soaking in 10% HNO$_3$ and then rinsing several times with deionized water.

EXAMPLE 2

Synthesis of AC/Al$_2$O$_3$, AC/Al$_2$O$_3$/PEI and AC/PEI Composites

The synthesis process 100A of AC/Al$_2$O$_3$/PEI composite, illustrated in FIG. 1A, can be divided into three parts: oxidation of AC, preparation of AC/Al$_2$O$_3$ and preparation of AC/Al$_2$O$_3$/PEI.

At step S101, AC was oxidized by mixing the pristine AC with a mixture of concentrated H$_2$SO$_4$ and HNO$_3$ (3:1); approximately 75 ml of H$_2$SO$_4$ and 25 ml of HNO$_3$ for 10 g of AC. The mixture was sonicated for 60 min. Then, the mixture was refluxed at 80° C. for 6 h, while stirring vigorously to accomplish the oxidation process. AC was extracted from the residual acids, by repeated cycles of dilution with triple-ionized water, and decanting the solutions. Then, the oxidized product was dried for 12 h in an oven at 100° C. The dried, oxidized AC was then milled with a ball-mill.

At step S102A, the composite of AC/Al$_2$O$_3$ was prepared via co-precipitation method. Oxidized AC (o-AC) was dispersed in 150 mL of aqueous media containing ethanol and ethylene glycol by the use of sonicator. An aqueous solution containing a specific amount of aluminum nitrate was prepared and then drop-wise added into the AC mixture. The mixture was stirred for 24 h at 50° C. The pH of the mixture was then controlled and the mixture was heated under reflux at 90° C. for 12 h with stirring. The precipitate was then cooled, filtered, washed and dried at 110° C. overnight. The product was calcined at 350° C. for 4 h. In this step, Al$_2$O$_3$ nanoparticles were formed in situ to coat the surface of AC.

Next, at step S103A, the prepared AC/Al$_2$O$_3$ was refluxed with ammonia. Then, ethylenediamine was added into the mixture, and the mixture was heated at 80° C. for 12 h under reflux condensation. The resulting product was collected, and designated as AC/Al$_2$O$_3$—NH$_2$. At step S104A, the obtained AC/Al$_2$O$_3$—NH$_2$ was dispersed into a mixture of dimethylformamide and methylacrylate or methyl methacrylate. The mixture was stirred at 40° C. for 2 days. The resulting microspheres were separated by centrifugation and washed several times with distilled water and ethanol. At step S105A, the obtained material AC/Al$_2$O$_3$—NH$_2$—COOCH$_3$ was then treated by adding aqueous solution of PEI under stirring at 80° C. for 12 h. The final product, AC/Al$_2$O$_3$/PEI, was then separated and washed with distilled water and ethanol.

In the AC/Al$_2$O$_3$/PEI composite synthesized by process 100A, a covalent bond (an amide linkage) is formed between PEI and AC/Al$_2$O$_3$. The leaving group —OCH$_3$ in the intermediate AC/Al$_2$O$_3$—NH$_2$—COOCH$_3$ (see step S105A of FIG. 1A) is replaced by attaching N from PEI. Therefore, —OCH$_3$ from AC/Al$_2$O$_3$—NH$_2$—COOCH$_3$ and a hydrogen atom from PEI are released as HOCH$_3$.

Alternatively, PEI is covalently bonded to an amide unity that is datively bonded to Al$_2$O$_3$ through a nitrogen atom.

Figure 1B:
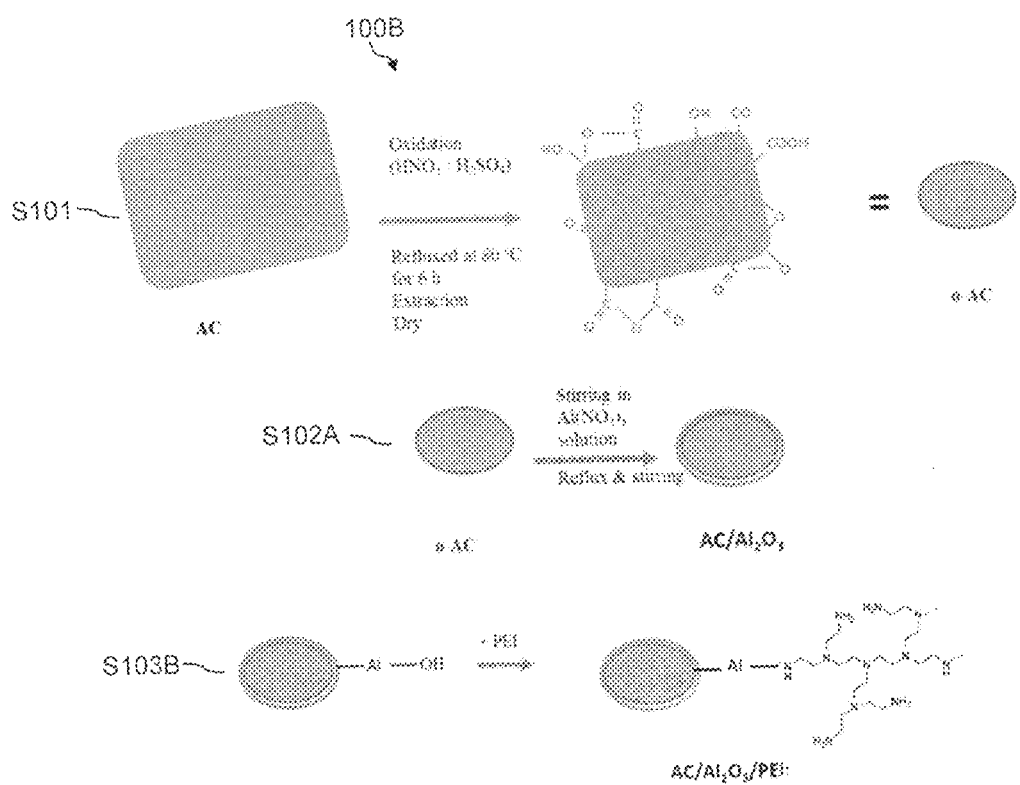
FIG. 1B is a schematic illustration of the preparation of activated carbon/alumina/polyethylenimine ($AC/Al_2O_3/PEI$) composite according to another embodiment.

FIG. 1B presents in an alternative process 100B for preparing the AC/Al$_2$O$_3$/PEI composite. At steps S101 and S102A, AC was oxidized and AC/Al$_2$O$_3$ was prepared as previously described. Then, at step S103B, an aqueous solution of PEI was added to AC/Al$_2$O$_3$ and the mixture was stirred at 80° C. for 12 h. The final product, AC/Al$_2$O$_3$/PEI, was then separated and washed with distilled water and ethanol. The OH group from AC/Al$_2$O$_3$ and a hydrogen atom from PEI will produce H$_2$O and an ionic Al—N bond is formed between PEI and AC/Al$_2$O$_3$.

Figure 1C:
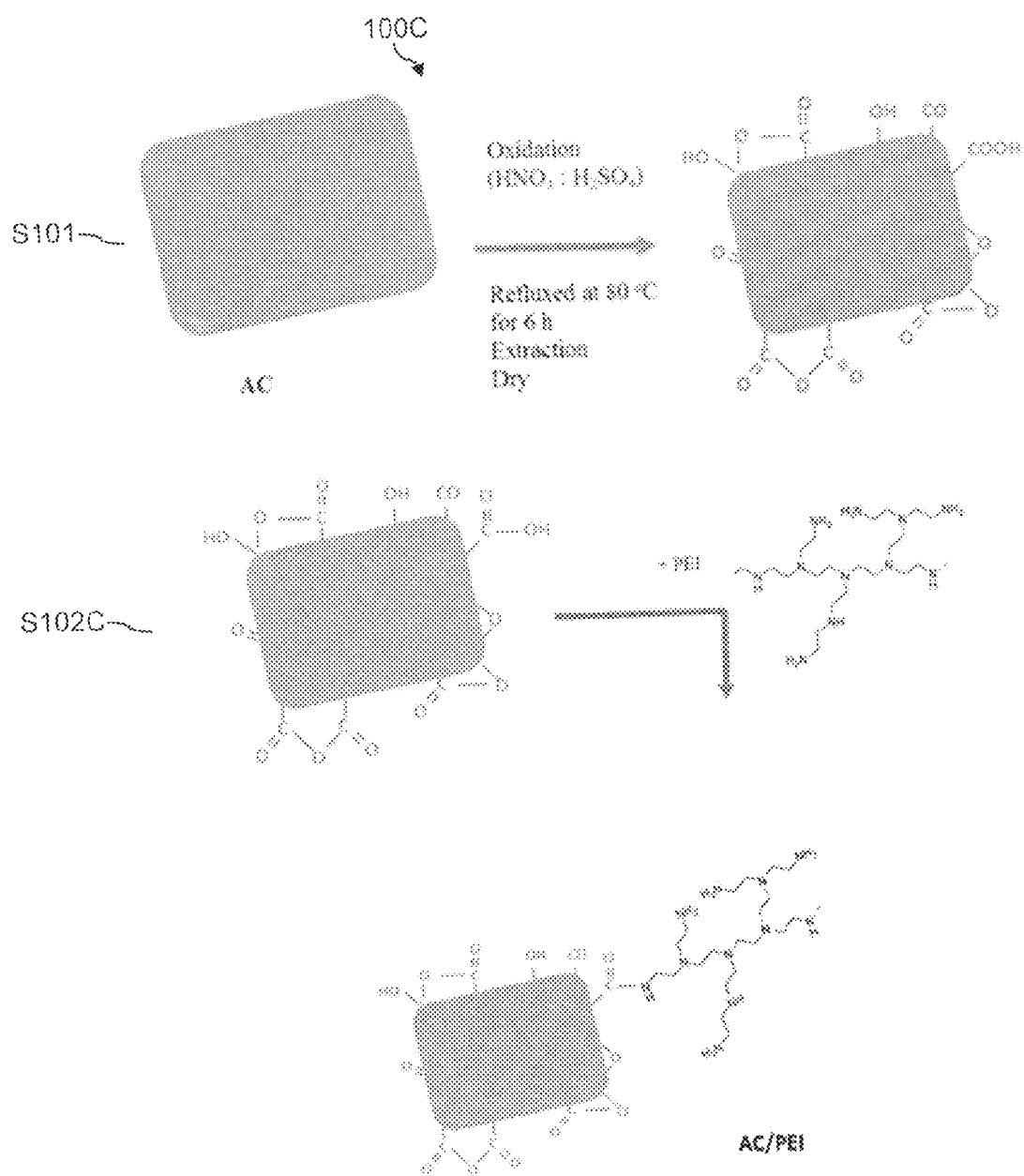
FIG. 1C is a schematic illustration of the preparation of activated carbon/polyethylenimine (AC/PEI) composite according to one embodiment.

FIG. 1C illustrates the synthesis route for AC/PEI. At step S101 of process 100C, AC was oxidized into o-AC as previously described. At step 102C, an aqueous solution of PEI was added to o-AC and the mixture was stirred at 80° C. for 12 h. The final product, AC/PEI, was then separated and washed with distilled water and ethanol. An amide covalent linkage is formed between o-AC and PEI in AC/PEI and the OH from the carboxylic group on o-AC will combine with a hydrogen atom from PEI to produce H$_2$O.

EXAMPLE 3

Characterization and Analysis of AC, AC/Al$_2$O$_3$ and AC/Al$_2$O$_3$/PEI

Scanning electron microscope (SEM) and energy dispersive X-ray (EDX) were used for characterization the morphology of AC, AC/Al$_2$O$_3$ and AC/Al$_2$O$_3$/PEI before or without adsorption. Infrared absorption spectra were measured at room temperature on a Fourier transform infrared absorption spectrometer (FTIR). Samples were prepared by gently mixing 10 mg with 300 mg of KBr powder and compressed into discs at a force of 17 kN for 5 min using a manual tablet presser. pH measurements were monitored with a Fisher model 25 pH meter calibrated with three buffered (pH 4, 7, and 10) solutions. Mercury determination was carried out with the mercury analyzer.

The functionalization of AC with oxygen containing groups is an important step for the preparation of the composites. Thus, the successful of AC oxidization and functionalization was confirmed by FTIR.

Figure 2:
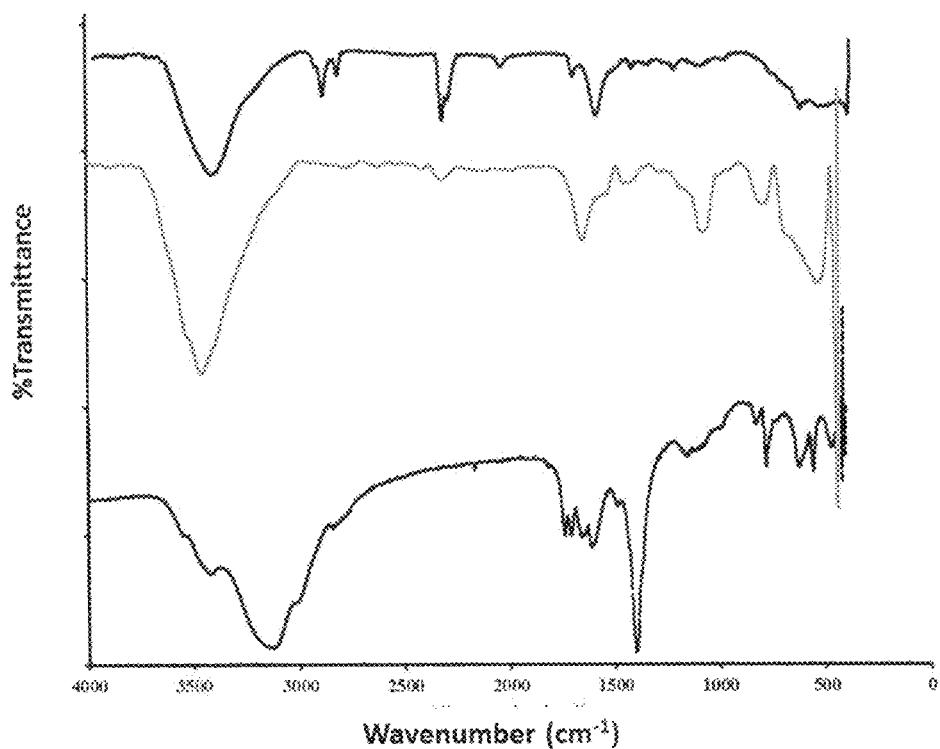
FIG. 2 illustrates Fourier transform infrared spectroscopy (FTIR) spectra of AC (top), $AC/Al_2O_3$ (middle) and $AC/Al_2O_3/PEI$ (bottom).

In FIG. 2, FTIR spectra of AC (top), AC/Al$_2$O$_3$ (middle) and AC/Al$_2$O$_3$/PEI (bottom) are shown.

After oxidation of the AC with a mixture of H$_2$SO$_4$ and HNO$_3$, the peak at 1680 cm$^{-1}$ which is associated with the asymmetric C═O stretching band of the carboxylic acid (—COOH) group, is clear in the FTIR spectrum of AC (top spectrum). The presence of broad peak at about 3400-3500 cm$^{-1}$ indicates the generation of hydroxyl groups. The peak at ≈1080 cm$^{-1}$ is attributed due to C—O bond stretching. The band at 1580 cm$^{-1}$ is due to stretching vibrations of isolated C═C double bonds. Bands at 2850 and 2910 cm$^{-1}$ are due to asymmetric and symmetric stretching of CH and indicative of the presence of aliphatic —CH$_2$ groups. The peak at 2355 cm$^{-1}$ is attributed due to one or more of the groups (—N═C═O; —C≡N; —C═C═O; —C═N═O), due to nitration under our experimental conditions. The FTIR spectrum of the AC indicates the characteristic features of the oxygen containing groups present in the AC. Therefore, different functional groups might be introduced on the AC surface including alcoholic, carboxylic, aldehydic, ketonic, and esteric oxygenated functional groups in addition to carboxylic anhydrides and ether-type. The acidity of AC was confirmed also by acid-base titration method or Boehm titration.

As shown in FIG. 2, specifically the middle spectrum which is the FTIR spectrum of AC/Al$_2$O$_3$, the appearance of a peak at ≈1380 cm$^{-1}$ is indicative of the symmetric carboxylate stretching mode. Depending on the coordination structures in metal complexes with carboxylic groups, the positions of symmetric COO— stretching bands considerably change within 1450-1300 cm$^{-1}$. The strong peak assigned to C═O stretching band at 1680 cm$^{-1}$ in the spectrum of is shifted to ≈1610 cm$^{-1}$ in AC/Alumina. This indicates that the double bond between carbon and oxygen becomes longer and weaker as a result of formation of electrostatic ionic bond with aluminum. IR spectra of AC/Al$_2$O$_3$ composites indicate a band at around 500 cm$^{-1}$ reveals the vibrational properties of Al—O bond (vAl—O), which is obviously caused by the existence of alumina.

Still referring to FIG. 2 and comparing the bottom AC/Al$_2$O$_3$/PEI spectrum to the top and middle spectra of AC and AC/Al$_2$O$_3$ respectively, new bands at 1635 (C(O)N(H)), 1570, 3375 and 3285 cm$^{-1}$ (N H) appeared. The bands at 2850 and 2980 cm$^{-1}$ can be assigned to the stretching vibration of —CH$_2$ in the PEI chain. Bands at 1590 and 1495 cm$^{-1}$ can be assigned due to the symmetric and asymmetric bending vibration of —NH$_2$, and another one at 1660 cm$^{-1}$ could be attributed to the bending vibration of —N(R)H in PEI. These bands indicated that PEI was successfully grafted onto the surface of the AC/Al$_2$O$_3$.

Figure 3A:
FIG. 3A is a scanning electron microscopy (SEM) image of AC.
Figure 3B:
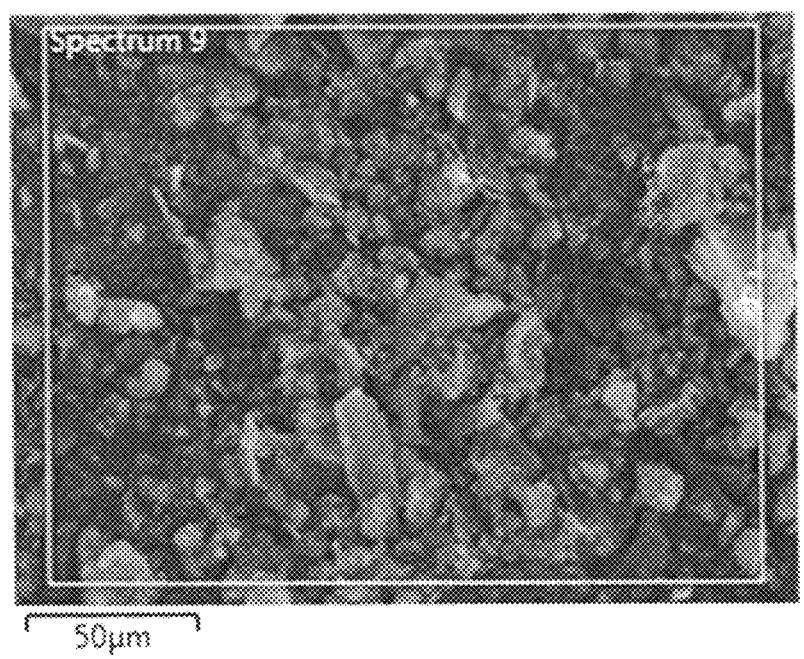
FIG. 3B is a SEM image of $AC/Al_2O_3$.
Figure 3C:
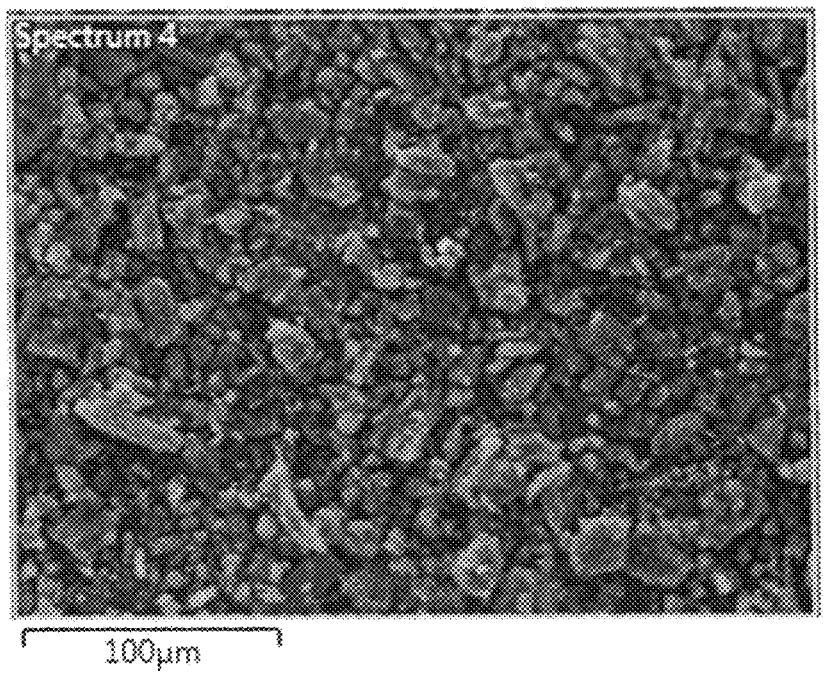
FIG. 3C is a SEM image of $AC/Al_2O_3/PEI$.
Figure 4A:
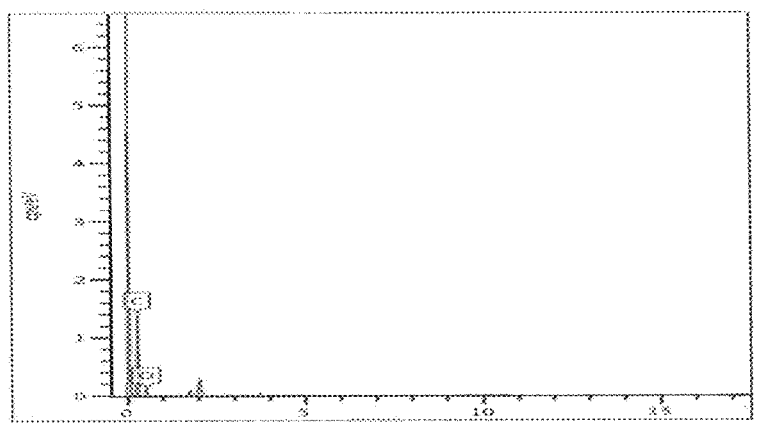
FIG. 4A is an energy dispersive X-ray (EDX) spectrum of AC.
Figure 4B:
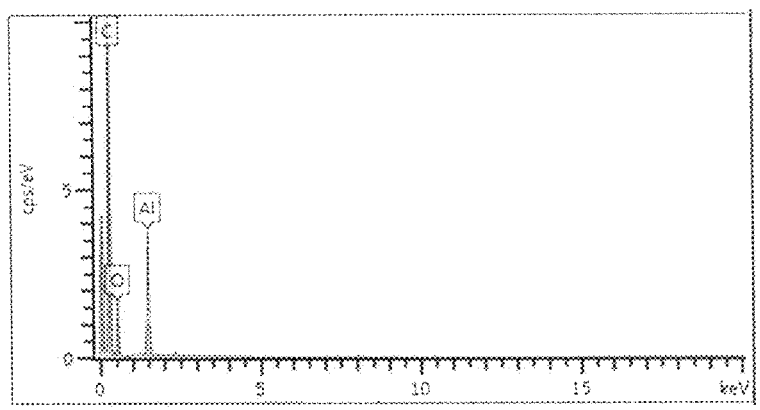
FIG. 4B is an EDX spectrum of $AC/Al_2O_3$.
Figure 4C:
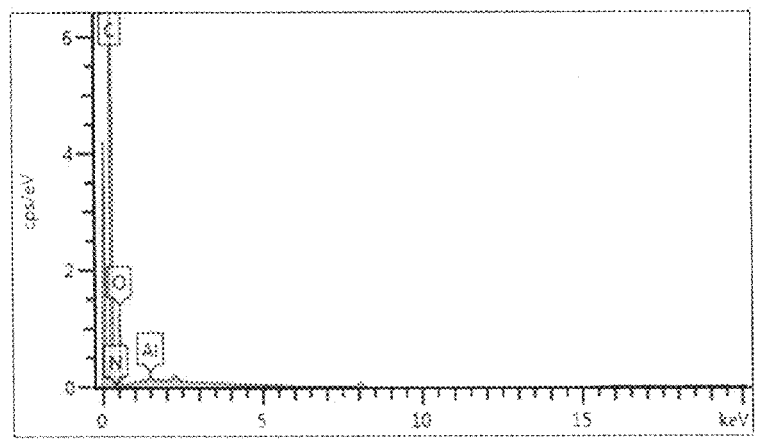
FIG. 4C is an EDX spectrum of $AC/Al_2O_3/PEI$.

FIGS. 3A-3C show SEM images of AC, AC/Al$_2$O$_3$ and AC/Al$_2$O$_3$/PEI, respectively. EDX spectra of AC, AC/Al$_2$O$_3$ and AC/Al$_2$O$_3$/PEI are depicted in FIGS. 4A-4C, respectively. The chemical composition data of AC, AC/Al$_2$O$_3$ and AC/Al$_2$O$_3$/PEI derived from the EDX analyses is presented in Tables 1-3, respectively. The data in Tables 1-3 indicates that AC contains carbon and oxygen, AC/Al$_2$O$_3$ contains carbon, oxygen, and aluminum while AC/Al$_2$O$_3$/PEI contains carbon, oxygen, nitrogen and aluminum. The source of nitrogen is PEI, which indicates the successful of the polymerization of the PEI on the AC/Al$_2$O$_3$ surface.

TABLE 1

Energy dispersive X-ray analysis (EDX) quantitative microanalysis of AC.

| Element | Apparent Concentration | Wt. % |
|---------|------------------------|-------|
| C | 123.32 | 94.64 |
| O | 16.55 | 5.36 |
| Total: | | 100.00 |

TABLE 2

Energy dispersive X-ray analysis (EDX) quantitative microanalysis of AC/Al$_2$O$_3$

| Element | Apparent Concentration | Wt. % |
| --- | --- | --- |
| C | 98.88 | 74.51 |
| O | 19.93 | 19.52 |
| Al | 14.79 | 5.97 |
| Total: | | 100.00 |

TABLE 3

Energy dispersive X-ray analysis (EDX) quantitative microanalysis of AC/Al$_2$O$_3$/PEI.

| Element | Apparent Concentration | Wt. % |
| --- | --- | --- |
| C | 127.34 | 78.07 |
| N | 1.95 | 1.46 |
| O | 17.05 | 20.17 |
| Al | 0.61 | 0.29 |
| Total: | | 100.00 |

EXAMPLE 4

Adsorption Performance of AC, AC/Al$_2$O$_3$ and AC/Al$_2$O$_3$/PEI

The adsorption performance of AC, AC/Al$_2$O$_3$ and AC/Al$_2$O$_3$/PEI was tested by utilizing mercury as a model of toxic metals pollutants in wastewater. The materials were tested in batch mode and column system. Other factors that may influence adsorption efficiency such as contact time, equilibrium time and pH effect were also explored.

Batch mode adsorption studies were carried out with a desired dosage of adsorbent and 20 ml of Hg(II) solution of a desired concentration and pH in 80 ml container and were agitated for predetermined intervals at room temperature in a mechanical shaker. At the end of the agitation the suspension were filtered and the filtrate was analyzed for mercury. Material suspensions were used to carry the experiments in present of mercury solutions in closed flasks. The flasks were on a rotary shaker at 150 rounds per minute at room temperature (25° C.±1). Samples were collected at various time points and mercury concentration was measured by the mercury analyzer.

Figure 5:
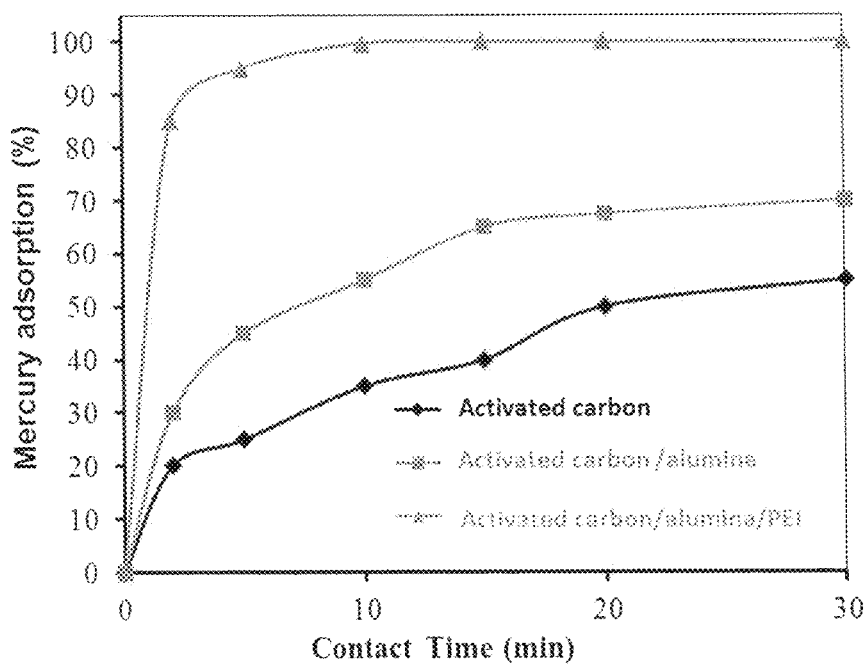
FIG. 5 is a graph illustrating changes in mercury content in solution vs. time reaction for AC, $AC/Al_2O_3$ and $AC/Al_2O_3/PEI$.

The equilibrium time was determined with a mercury concentration of 20 ppm. At regular time intervals (2, 5, 10, 15, 20, 30, 40, 50, 60, 120 min), mercury concentration was determined. The effect of contact time on the removal of mercury (II) is shown in FIG. 5. As shown in FIG. 5, the removal increases with time and attains equilibrium within 30, 20, 15 min for the AC, AC/Al$_2$O$_3$ and AC/Al$_2$O$_3$/PEI respectively.

The effect of contact time (0-30 min) on the adsorption of mercury (II) is depicted in FIG. 5. The AC shows low adsorption efficiency toward mercury (II). As depicted in FIG. 5, with AC/Al$_2$O$_3$ as an adsorbent, a maximum removal efficiency of about 70% was achieved after a contact time of 30 min, compared to around 55% removal using AC. Further adsorption efficiency was obtained when AC/Al$_2$O$_3$/PEI was used, wherein a 100% mercury removal was achieved.

However, in a contact time of 10 min, 35, 55 and 99% mercury removal was achieved using the AC, AC/Al$_2$O$_3$ and AC/Al$_2$O$_3$/PEI respectively.

The higher adsorption efficiency of the AC/Al$_2$O$_3$/PEI composite can be attributed to the availability of large number of active sites. Also, the large number of active amino groups grafted onto the surface of the AC/Al$_2$O$_3$/PEI composite allowed the composite to be sufficiently dispersed in the aqueous solution and produced less external diffusion resistance resulted in enhanced adsorption efficacy. The effect of initial concentration of mercury (5, 20, 40, 80 ppm) was investigated. Complete removal was achieved using AC/Al$_2$O$_3$/PEI under the experimental conditions of 0.03 g dosage, 20 ml volume solution, rotary shaker at 150 rounds per minute at room temperature (25° C.±1) and 30 min contact time. In certain embodiments, the effective dosage of the AC composite in is 0.5-2.5 g/L based upon the volume of the aqueous medium treated.

Figure 6:
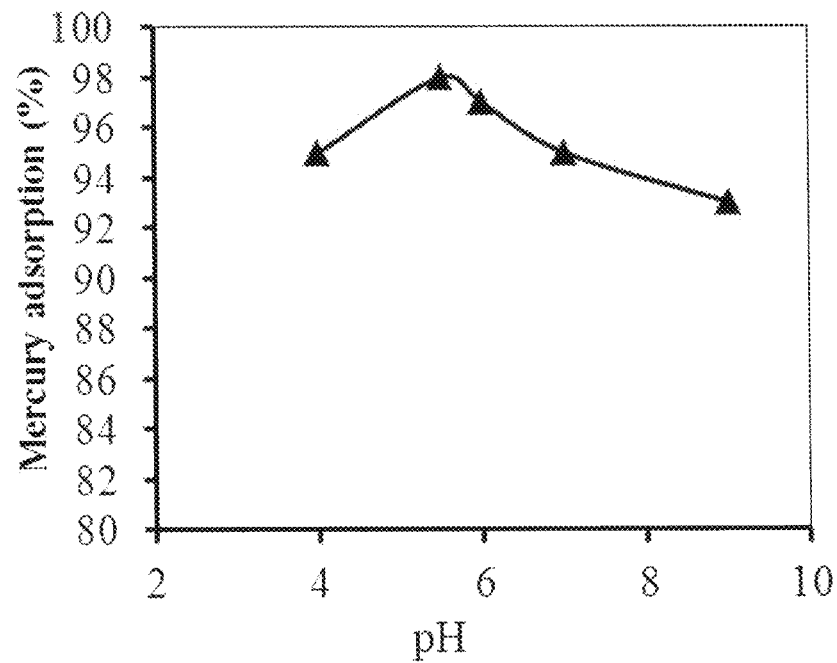
FIG. 6 is a graph illustrating influence of the pH of the solution on the mercury adsorption efficiency of $AC/Al_2O_3/PEI$ with a 0.8 g/L $AC/Al_2O_3/PEI$ dosage and a contact time of 30 min.
Figure 7A:
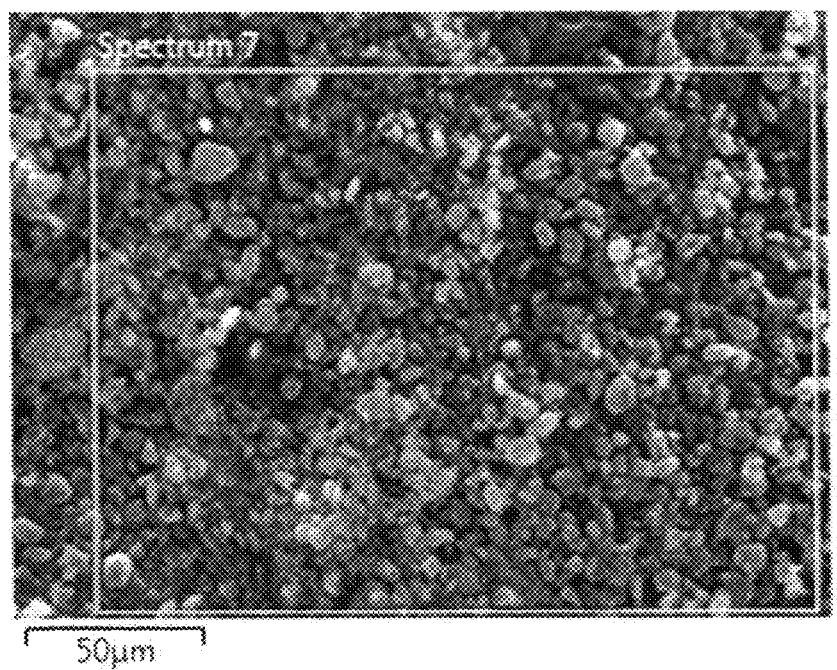
FIG. 7A is an SEM image of mercury adsorbed on AC.
Figure 7B:
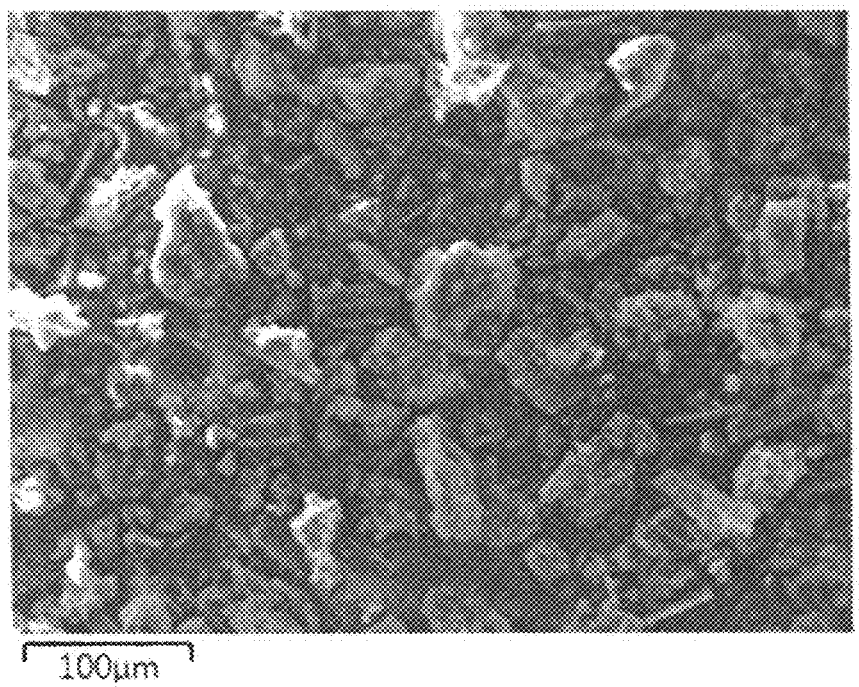
FIG. 7B is an SEM image of mercury adsorbed on $AC/Al_2O_3$.
Figure 7C:
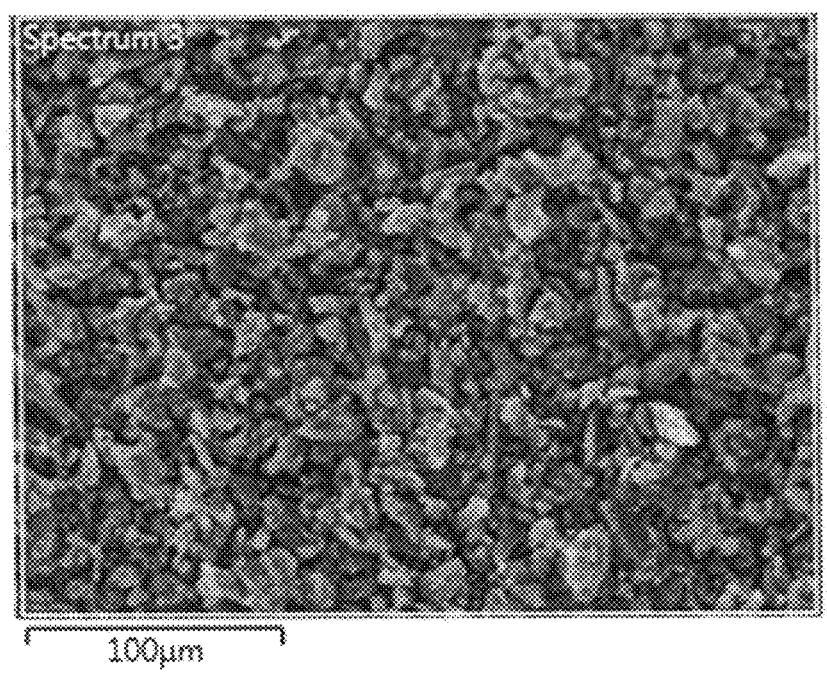
FIG. 7C is an SEM image of mercury adsorbed on $AC/Al_2O_3/PEI$.
Figure 8A:
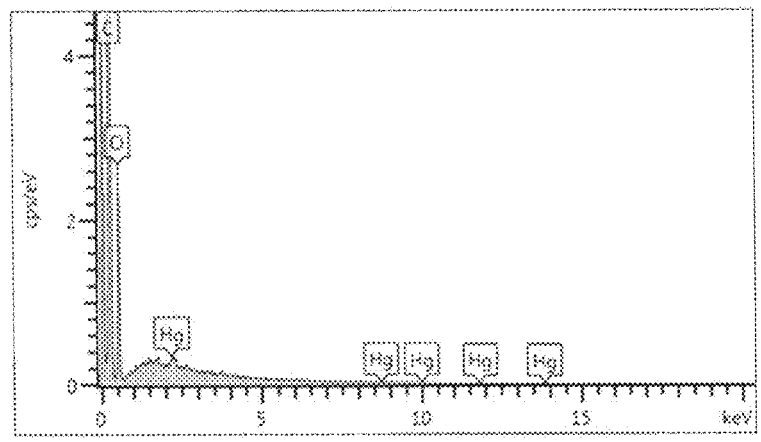
FIG. 8A is an EDX spectrum of mercury adsorbed on AC.
Figure 8B:
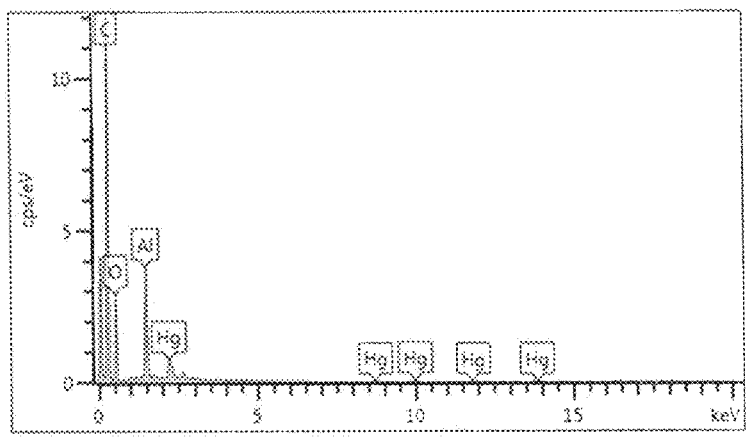
FIG. 8B is an EDX spectrum of mercury adsorbed on $AC/Al_2O_3$.
Figure 8C:
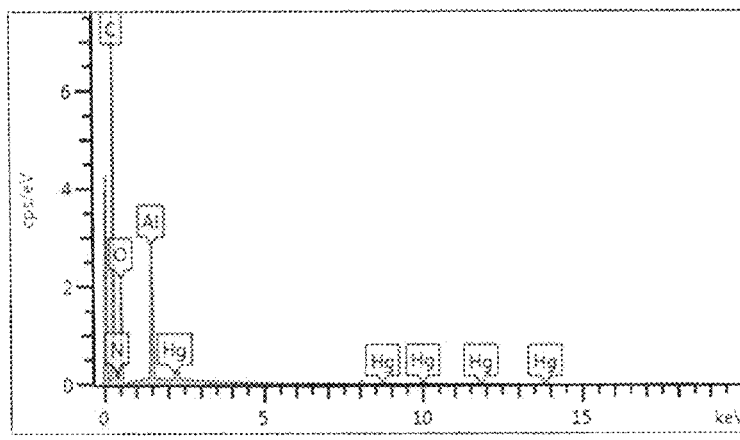
FIG. 8C is an EDX spectrum of mercury adsorbed on $AC/Al_2O_3/PEI$.

The effect of variation of the initial solution pH on the adsorption of mercury (II) was investigated by changing the initial pH as 4, 5.5, 7 and 9. As presented in FIG. 6, the efficiency of AC/Al$_2$O$_3$/PEI toward the removal of mercury increases by increasing pH from 4 to 5.5 and then there is no significant change by further increasing the pH to 6 while a slight decrease in the removal was observed when the pH is increased from 7 to 9. However, the pH effect on the adsorption process was not significant.

Further to batch mode experiments, the efficiency of AC/Al$_2$O$_3$/PEI for the removal of mercury was examined and compared (to AC and AC/Al$_2$O$_3$) in a column system of 5 cm length and 1 cm diameter. A porous sheet was placed at the inlet of the column to support the material and to obtain a good liquid phase distribution and uniform inlet flow into the column. The outlet of the column was filled with glass beads to prevent loss of adsorbent material. The solutions studied were introduced as eluent in the column in up-flow mode with a peristaltic pump. The flow rate was studied and the optimum flow rate was found to be around 5 mL/min under the experimental conditions. Aliquots (from the eluate) were collected at the top of the column and the mercury concentration was measured by mercury analyzer. When samples with initial concentration of 20 ppm were introduced into the column packed with AC/Al$_2$O$_3$/PEI (at a dosage of 0.3-1 g per milliliter of the column volume, preferably 0.4-0.8 g, more preferably 0.5-0.7 g), a complete removal of mercury was observed while 88% removal was observed when the column was packed with AC/Al$_2$O$_3$, and 75% was achieved when AC was used. The breakthrough time was 60, 140 and 220 min for AC, Al$_2$O$_3$ and AC/Al$_2$O$_3$/PEI respectively under the optimum flow rate of 5 mL/min and initial concentration of 20 ppm. Based on the breakthrough time, it was assumed that the adsorption capacity of the AC, AC/Al$_2$O$_3$ and AC/Al$_2$O$_3$/PEI is saturated. High reduction percentages were found to be in the following order: AC/Al$_2$O$_3$/PEI>AC/Al$_2$O$_3$>AC. It can be inferred that alumina provides good mechanical stability to the AC/Al$_2$O$_3$ and AC/Al$_2$O$_3$/PEI composites.

AC, AC/Al$_2$O$_3$ and AC/Al$_2$O$_3$/PEI were also tested for the removal of mercury from real water samples. Thus, the water samples were spiked with 20 ppm mercury. The removal efficiency of mercury in these samples was found to be in the following order: AC/Al$_2$O$_3$/PEI>AC/Al$_2$O$_3$>AC.

The adsorbents used in the batch and column experiments were collected after elimination process, dried and analyzed by SEM and EDX. This characterization was performed to observe material surface after the contact with mercury solutions and to determine the mercury deposits presence in the material structures. FIGS. 7A-7C and 8A-8C show representative SEM images and EDX spectra of AC, AC/Al$_2$O$_3$ and AC/Al$_2$O$_3$/PEI after adsorption of mercury (II), respectively. From these SEM images and EDX spectra, it can be seen that mercury is deposited on the materials surfaces in the order of $AC/Al_2O_3/PEI > AC/Al_2O_3 > AC$. Tables 4-6 present results of semi-quantitative analyses of the elements present in AC, $AC/Al_2O_3$ and $AC/Al_2O_3/PEI$ after mercury adsorption, respectively. The data in Tables 4-6 confirms mercury removal by adsorption on the surface of the prepared materials and performance of the materials was further enhanced by the PEI in $AC/Al_2O_3/PEI$, compared to both $AC/Al_2O_3$ and AC.

TABLE 4

EDX quantitative microanalysis of AC after mercury adsorption.

| Element | Apparent Concentration | Wt. % |
| --- | --- | --- |
| C | 120.18 | 82.60 |
| O | 11.21 | 16.90 |
| Hg | 0.86 | 0.50 |
| Total: | | 100.00 |

TABLE 5

EDX quantitative microanalysis of $AC/Al_2O_3$ after mercury adsorption.

| Element | Apparent Concentration | Wt. % |
| --- | --- | --- |
| C | 89.50 | 69.36 |
| O | 25.36 | 23.25 |
| Al | 10.84 | 4.53 |
| Hg | 6.59 | 2.86 |
| Total: | | 100.00 |

TABLE 6

EDX quantitative microanalysis of $AC/Al_2O_3/PEI$ after mercury adsorption.

| Element | Apparent Concentration | Wt. % |
| --- | --- | --- |
| C | 74.91 | 60.75 |
| N | 7.06 | 5.89 |
| O | 23.92 | 24.53 |
| Al | 12.54 | 5.28 |
| Hg | 7.40 | 3.55 |
| Total: | | 100.00 |

EXAMPLE 5

Desorption and Regeneration of AC, $AC/Al_2O_3$ and $AC/Al_2O_3/PEI$

Figure 9:
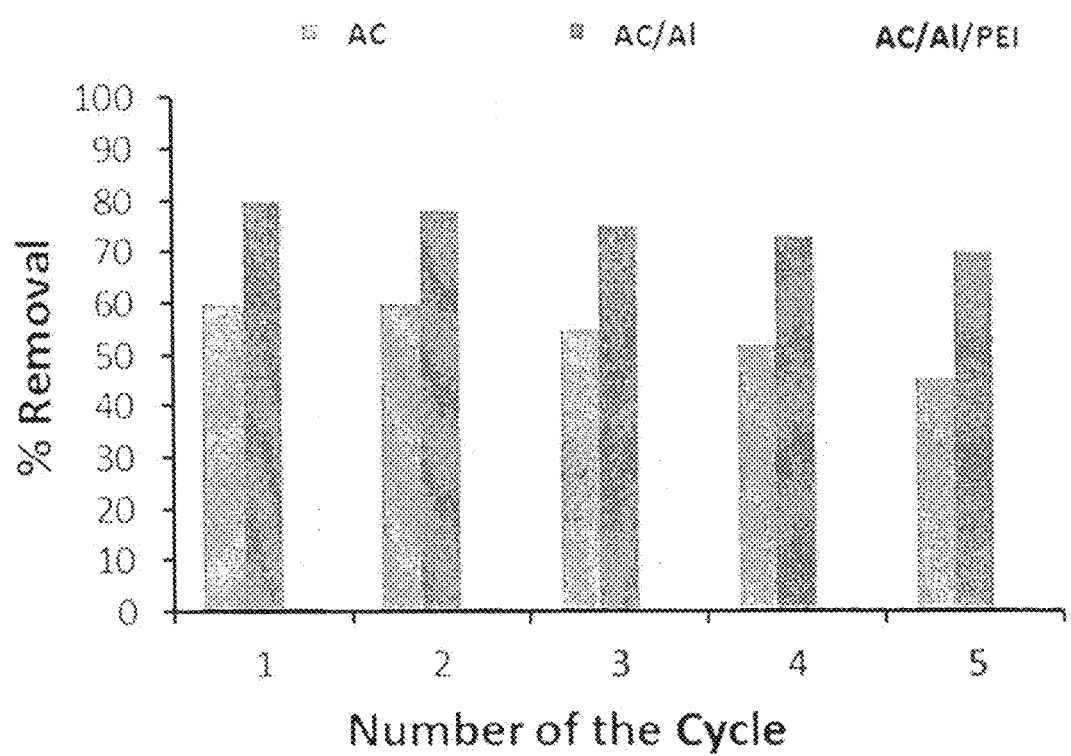
FIG. 9 is a bar graph illustrating mercury adsorption efficiencies of AC, $AC/Al_2O_3$ and $AC/Al_2O_3/PEI$ after 1-5 cycles of regeneration.

Regeneration tests are important to evaluate the applicability of the materials as adsorbent for the removal of pollutants from water. The mercury Hg(II) desorption process was conducted by immersing and agitating the matrix of adsorbent-adsorbate in 1-2 M NaOH solution for 3 h. It was then filtered and rinsed with deionized water, then dried and used again as adsorbents. As shown in FIG. 9, it appears that AC, $AC/Al_2O_3$ and $AC/Al_2O_3/PEI$ could be successfully regenerated since the adsorbate (mercury) was removed without affecting their structures and subsequent adsorption performance for at least 5 cycles of regeneration.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An activated carbon/aluminum oxide/polyethyleneimine composite comprising:
   an activated carbon particle core;
   an aluminum oxide coating on the surface of the activated carbon particle core; and
   a polyethyleneimine polymer covalently or ionically bonded to the aluminum oxide coating.

2. The activated carbon/aluminum oxide/polyethyleneimine composite of claim 1, wherein the aluminum oxide coating comprises aluminum oxide nanoparticles attached to the surface of the activated carbon particle core.

3. The activated carbon/aluminum oxide/polyethyleneimine composite of claim 1, wherein the polyethyleneimine polymer is covalently bonded to the aluminum oxide coating through an amide linkage.

4. The activated carbon/aluminum oxide/polyethyleneimine composite of claim 1, wherein the polyethyleneimine polymer is ionically bonded to the aluminum oxide coating through an Al-N linkage.

5. The activated carbon/aluminum oxide/polyethyleneimine composite of claim 1, wherein the activated carbon/aluminum oxide/polyethyleneimine composite has an aluminum content of 1-2 wt. % based upon the total weight of the composite.

6. The activated carbon/aluminum oxide/polyethyleneimine composite of claim 1, wherein the activated carbon/aluminum oxide/polyethyleneimine composite has a nitrogen content of 1-2 wt. % based upon the total weight of the composite.

7. The activated carbon/aluminum oxide/polyethyleneimine composite of claim 1, wherein the activated carbon is in powder form.

8. The activated carbon/aluminum oxide/polyethyleneimine composite of claim 1, wherein the activated carbon is in granular form.

9. A method of removing mercury from an aqueous medium, comprising:
   contacting the aqueous medium with the activated carbon/aluminum oxide/polyethyleneimine composite of claim 1 to adsorb mercury from the aqueous medium.

10. The method of claim 9, further comprising:
    desorbing the mercury from the activated carbon/aluminum oxide/polyethyleneimine composite to regenerate the activated carbon/aluminum oxide/polyethyleneimine composite for mercury removal.

11. The method of claim 9, wherein the contacting is carried out in a batch mode.

12. The method of claim 9, wherein the contacting is carried out in a fixed-bed mode.

13. The method of claim 9, wherein the contacting is carried out for 2-30 min.

14. The method of claim 9, wherein the contacting is carried out at pH 4-9.

15. The method of claim 11, wherein the activated carbon/aluminum oxide/polyethyleneimine composite is effective in a dosage of 0.2-2.0 g/L.

16. The method of claim 12, wherein the activated carbon/aluminum oxide/polyethyleneimine composite is effective in a dosage of 0.3-1 g/mL based on a fixed-bed volume.

17. A method of preparing the activated carbon/aluminum oxide/polyethyleneimine composite of claim 1, comprising:
   oxidizing the activated carbon to form an oxidized activated carbon;
   co-precipitating the oxidized activated carbon with an aluminum salt to form an activated carbon/aluminum oxide intermediate; and
   impregnating the activated carbon/aluminum oxide intermediate with polyethyleneimine to produce the activated carbon/aluminum oxide/polyethyleneimine composite.

* * * * *